March 26, 1929.   P. S. HARPER   1,707,007
GAS RANGE COCK
Filed May 16, 1927
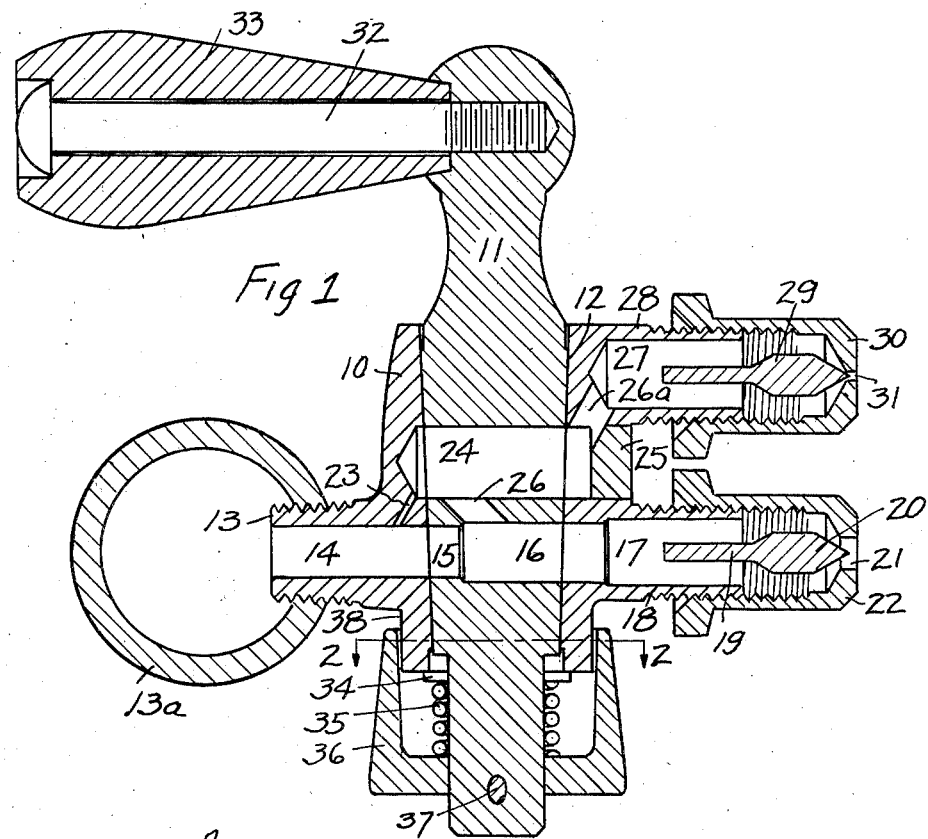
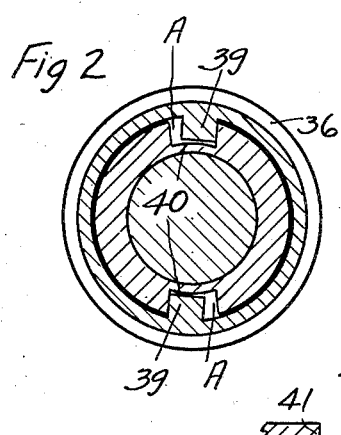
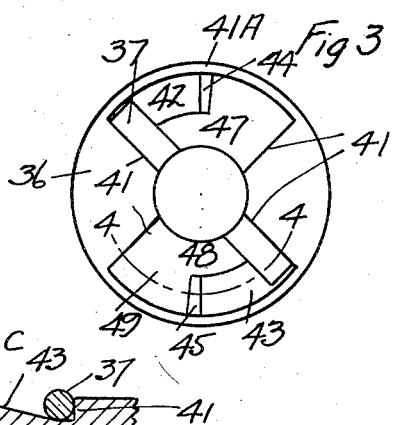
Inventor
Philip S. Harper Patented Mar. 26, 1929.

1,707,007

UNITED STATES PATENT OFFICE.

PHILIP S. HARPER, OF CHICAGO, ILLINOIS.

GAS-RANGE COCK.

Application filed May 16, 1927. Serial No. 191,643.

This invention relates to stops to indicate and limit the open and closed positions of valves of plug type and particularly of gas range cocks, and means for indicating other operating positions of such valves.

The invention in a preferred form consists of a washer located on the operating stem of a gas range cock, said washer being keyed in the body of said cock limiting its rotary movement, a pin through said stem on which said washer bears, a spring maintaining said washer in bearing against said pin, and said washer having suitable depressions on the surface engaging said pin whereby the desired operating positions are indicated.

The object of this invention is to provide a stop to indicate with certainty a definite position of the plug in a gas range cock.

Another object is to provide a stop which will give an audible sound when the plug is turned to a desired position.

Another object of this invention is to eliminate some of the parts in a gas range cock, and at the same time provide a cock in which the parts holding the plug seated cannot come loose and cease to function.

Another object is to provide a cock in which the efficiency of parts holding the plug seated is not impaired by dissassembling said cock.

These and other objects will be more apparent from the drawings in which—

Figure 1 is a sectional elevation of a gas range cock of this invention;

Figure 2 is a sectional view along line 2—2 of Figure 1;

Figure 3 is a bottom view of the stop washer 36 with the pin 37 in assembled position; and Figure 4 is a section along line 4—4 of Figure 3, developed on a plane.

Referring now specifically to the drawings, a gas cock casing 10 is shown with a plug 11 fitted into a tapered hole 12 therein and ground to a tight and proper bearing in said taper. A threaded spud 13 projects from one end of said casing for connection to a gas range manifold pipe 13ª. In said spud there is a passage 14 continuing into the plug as 15 and enlarging at 16, and continuing in such enlarged size out of the other side of the plug and again into the casing 10. Said passage again enlarges in said casing at 17 and passes into threaded nozzle spud 18 as shown. A jet 19 is fitted into said enlarged portion 17, said jet being flat in said passage portion 17 for the passage of gas on each side thereof, and said jet is conical on the outer end 20 to project into nozzle orifice 21 in the hood 22, which is threaded onto said nozzle spud 18. The hood 22 may be screwed more or less onto the nozzle spud 18 so as to have the conical portion 20 of the jet 19 project more or less into the orifice 21 as the case requires, this entire construction of a conical projection and hood forming an adjustable gas range nozzle of commonly accepted design.

Returning now to the initial passage 14 in the spud 13, a small pilot passage 23 branches off therefrom and enters a passage 24 which passes through the plug 11. Said passage 24 is substantially parallel to the previous port through the plug 14, 15 and 16, but is larger than any part of said previous port 14, 15 and 16 for purposes to be disclosed. A stopper plug 25 closes the outer end of the passage 24 in an effective manner. An equalizing hole 26 connects this passage 24 with the passage 14, 15 and 16 in said plug for purposes disclosed in my co-pending application Serial No. 215,017 filed August 24, 1927.

From the outer end of passage 16 there leads a passage 26ª connecting said passage 16 with an enlarged passage 27 which is in an upper threaded nozzle spud 28. Said nozzle spud 28 is similar to the former nozzle spud 18 and is fitted with a similar jet 29 and similar hood 30 having therein an orifice 31.

The upper end of said plug 11 has a stove bolt 32 threaded therein to hold a porcelain handle 33 after the regular construction of gas range cocks.

The lower end of said plug has a bearing washer 34 thereon, a compression spring 35 and a stop washer 36 in the order named. A pin 37 extends transversely through said plug below the stop washer 36 and holds said parts in assembled relation. Said stop washer 36 extends upward and around the lower end 38 of the casing 10 and is keyed with internal keys 39 in corresponding depressions or slots 40 in said casing 10, this construction being shown in Figure 2 of the drawings. Said keys 39 do not fit tightly in the slots 40 but there is a definite amount of play as the distance "A" allowing the stop washer to have a limited amount of rotary motion for purposes to be disclosed.

The under surface of said stop washer 36 has stops 41 limiting the turning of the plug to substantially 90 degrees or whatever the angle may be between the fully open and fully closed position of said plug. A rim 41^A effectively prevents the pin from coming out during the regular operation of the cock, but the pin may easily be removed and the cock disassembled by raising the washer 36 and compressing the spring until said pin may be removed entirely clear of said rim.

In addition there are inclined planes 42 and 43 and inclined planes 44 and 45 providing a cam surface on which said pin bears. On the turning of the cock from open to closed position, that is, from the open position of the pin shown in a counter-clockwise direction, the pin travels up the inclined planes 42 and 43 and in so doing, rotates the stop washer in the direction of rotation the amount permitted by the lost motion "A" of the keys 39 in the slots 40. This continues until the pin 37 reaches the crests 47 and 48 of the cam surface and when just past this point, the tendency of the stop washer is to rotate quickly in the opposite direction which it does to the exent of the lost motion "A" and the resulting snap indicates to the operator that a definite position in the turning of the plug has been reached. The lost motion "A" is made of such an amount as to allow the pin to reach the plane surface 49 from the extreme position as centered on top of the crests 47 and 48 where said snap action could start, or from position "C" in Figure 4 to position "D" in said figure. The construction is therefore such that in a common position of the plug the pin is resting on the horizontal plane surfaces 49 and against the steep inclined surfaces 44 and 45 in position "D" with the lost motion "A" taken up in one direction, or with the lost motion taken up in the other direction, the pin is located on the crests 47 and 48 in position "C" substantially where the snapping action starts. This common position of the plug is therefore definitely located no matter in which direction the plug is turned, for in approaching this common plug position from one direction the snapping action takes place, and in approaching from the other direction a very definite indication is reached when the pin strikes the steep planes 44 and 45. Another characteristic of this type of indication for the common plug position is that there is no hindrance to turning the plug in one direction from this common point, that is in the direction of the snapping action, whereas there is a very great hindrance to turning in the opposite direction or in the direction of the planes 44 and 45 since the stop plate has to suddenly rise and compress the spring in order to pass this common point in this given direction.

As disclosed the port 16 through the plug is considerably larger than port 14, for the purposes discussed in my co-pending application Serial No. 439,905, filed January 26, 1921, so that the gas flowing will shut off in the smaller port while the larger port is still open. It is desirable for the full advantage of the burner in this said application to provide a definite indication of the position of the plug where the smaller port is just cut off with a safe leeway, and consequently in this improvement the snapping position of the pin and stop washer is placed so as to act at this desired point. Then on turning off the gas from the lower passage there is a definite snap as soon as cut off, and there is no hindrance to turning the plug further in the same direction to partly cut off the flow of gas through the upper passage which is a condition frequently desired in the operation; on the other hand considerable effort is required to turn the plug backward past the indicating position, up the steep planes 44 and 45 to again allow gas to pass through the lower passage, and this is obviously a desirable feature in any gas appliance, since the arrangement should not be such that gas might be inadvertently turned into any passage, or burner or section of a burner without the knowledge of the operator.

While I have described more or less precisely the details of construction, I do not wish to be understood as limiting myself thereto, as I contemplate changes in form and the proportion of parts and the substitution of equivalents as circumstances may suggest or render expedient without departing from the spirit or scope of my invention.

I claim:

1. A gas cock comprising a body member and plug member, a pin extending transversely into said plug member, a stop washer bearing on said pin, said stop washer having means thereon extending in line with the transverse section of said pin, said stop washer being keyed in said body member restraining rotary motion, and a spring maintaining said stop washer in bearing against said pin.

2. A gas cock comprising a body member and plug member, a pin extending transversely into said plug member, a stop washer bearing on said pin, said stop washer having means thereon extending in line with the transverse section of said pin, said stop washer being keyed in said body member restraining rotary motion; said stop washer having stops limiting the traverse of said pin, and a spring maintaining said stop washer in bearing against said pin.

3. A gas cock comprising a body member and a plug member, a pin extending transversely into said plug member, a stop washer bearing on said pin, said stop washer being keyed in said body member restraining rotary motion, said key between said body member and said stop washer being loose to permit a limited amount of rotary motion of said stop washer with reference to said body member, a crest on said stop washer surface bearing on said pin, and a spring maintaining said stop washer in bearing against said pin.

4. A gas cock comprising a body member and a plug member, a bearing surface means restrained from rotation with reference to said body member, a means restrained from rotation with reference to said plug, a spring maintaining said means restrained from rotation with reference to said plug in contact with said bearing surface means, said bearing surface means having a crest thereon subject to contact with said means restrained from rotation with reference to said plug, one of said restrained means being provided with an amount of lost motion allowing a limited amount of unrestrained rotation with reference to its respective member wherefrom it is restrained.

5. A gas cock comprising a body member and a plug member, a means restrained with reference to said plug member, a means restrained from rotation with reference to said body member, a spring maintaining said means restrained from rotation with reference to said body member in contact with said means restrained from rotation with reference to said plug, one of said means having a crest thereon subject to contact with the other of said restrained means, one of said restrained means being provided with an amount of lost motion allowing a limited amount of unrestrained rotation with reference to its respective member wherefrom it is restrained.

6. A gas cock comprising a body member and a plug member, a bearing surface means restrained from rotation with reference to said body member, a means restrained from rotation with reference to said plug, a spring maintaining said means restrained from rotation with reference to said plug in contact with said bearing surface means, said bearing surface means having a crest thereon subject to contact with said means restrained from rotation with reference to said plug, at least one approach to said crest on said bearing surface being a steeply inclined surface, one of said restrained means being provided with an amount of lost motion allowing a limited amount of unrestrained rotation with reference to its respective member wherefrom it is restrained.

7. A gas cock comprising a body member and a plug member, a means restrained with reference to said plug member, a means restrained from rotation with reference to said body member, a spring maintaining said means restrained from rotation with reference to said body member in contact with said means restrained from rotation with reference to said plug, one of said means having a crest thereon subject to contact with the other of said restrained means, at least one approach to said crest on said bearing surface being a steeply inclined surface, one of said restrained means being provided with an amount of lost motion allowing a limited amount of unrestrained rotation with reference to its respective member wherefrom it is restrained.

8. A gas cock comprising a body member and a plug member, a bearing surface means restrained from rotation with reference to said body member, a means restrained from rotation with reference to said plug, a spring maintaining said means restrained from rotation with reference to said plug in contact with said bearing surface means, said bearing surface means having a crest thereon subject to contact with said means restrained from rotation with reference to said plug, at least one approach to said crest on said bearing surface being a steeply inclined surface, one of said restrained means being provided with an amount of lost motion allowing a limited amount of rotation with reference to its respective member wherefrom it is restrained, the amount of said lost motion being substantially sufficient to bring said means restrained from rotation with reference to said plug from the position of bearing on said crest to the position of bearing at the bottom of said steeply inclined surface approaching said crest.

9. A gas cock comprising a body member and a plug member, a means restrained with reference to said plug member, a means restrained from rotation with reference to said body member, a spring maintaining said means restrained from rotation with reference to said body member in contact with said means restrained from rotation with reference to said plug, one of said means having a crest thereon subject to contact with the other of said restrained means, at least one approach to said crest on said bearing surface being a steeply inclined surface, one of said restrained means being provided with an amount of lost motion allowing a limited amount of rotation with reference to its respective member wherefrom it is restrained, the amount of said lost motion being substantially sufficient to bring said means restrained from rotation with reference to said body from the position of bearing on said crest to the position of bearing at the bottom of said steeply inclined surface approaching said crest.

Signed at Chicago, Illinois, this 12th day of May, 1927.

PHILIP S. HARPER.